United States Patent [19]

DeMartino et al.

[11] Patent Number: 4,933,112

[45] Date of Patent: Jun. 12, 1990

[54] SIDE CHAIN LIQUID CRYSTALLINE POLYMERS EXHIBITING NONLINEAR OPTICAL PROPERTIES

[75] Inventors: Ronald N. DeMartino, Wayne; Hyun-Nam Yoon, New Providence; James B. Stamatoff, Westfield, all of N.J.

[73] Assignee: Hoechst Celanese Corp., Somerville, N.J.

[21] Appl. No.: 322,979

[22] Filed: Mar. 14, 1989

Related U.S. Application Data

[62] Division of Ser. No. 933,425, Nov. 21, 1986, Pat. No. 4,855,376.

[51] Int. Cl.$^5$ .......................... F21V 9/04; F21V 9/06
[52] U.S. Cl. .............................. 252/587; 252/299.01; 252/582; 252/589; 526/311
[58] Field of Search ............... 252/299.01, 582, 589, 252/299.1, 299.68, 581, 587; 428/1; 526/311

[56] References Cited

U.S. PATENT DOCUMENTS

| | | | |
|---|---|---|---|
| 3,041,165 | 6/1962 | Siis et al. | 96/1 |
| 3,253,022 | 5/1966 | Linder et al. | 260/518 |
| 3,483,131 | 12/1969 | Kovacic | 252/582 |
| 3,697,595 | 10/1972 | Clecak et al. | 260/566 R |
| 3,742,054 | 6/1973 | Dietrich et al. | 260/566 F |
| 3,872,140 | 3/1975 | Klanderman et al. | 260/566 F |
| 3,968,159 | 7/1976 | Igbal | 260/566 F |
| 3,973,830 | 8/1986 | Tsukamoto et al. | 252/299.6 |
| 4,122,026 | 10/1978 | Osman | 252/299.6 |
| 4,173,544 | 11/1979 | Osman | 252/299.6 |
| 4,297,502 | 10/1981 | Herrmann et al. | 560/35 |
| 4,370,502 | 1/1983 | Harada et al. | 564/411 |
| 4,434,262 | 2/1984 | Buckley et al. | 524/237 |
| 4,681,919 | 7/1987 | Yuki et al. | 525/292 |
| 4,694,066 | 9/1987 | DeMartino et al. | 528/373 |
| 4,779,961 | 10/1988 | DeMartino | 350/350 R |
| 4,855,376 | 8/1989 | DeMartino et al. | 526/311 |

OTHER PUBLICATIONS

Meredith, G. R. et al, Macromolecules 15, 1385, 1982.
Stamatoff, J. B. et al, S.P.I.E. vol. 682, 85, 1986.
Zeinalov, R. A., et al, Kristallografiya, 30(6) 1207-1209 1985.
LeBarny, P. et al, S.P.I. E. vol. 682, 56, 1986.
Griffin, A. C. et al, SPIE vol. 682, 21-22, Aug. 1986, San Diego CA, pp. 65-69.
Stamatoff et al., "Development of Polymeric Nonlinear Optical Materials", Mol. Poly. Optoel. Mat., SPIE vol. 682, 1986, p. 85.
Reck, "Combined Liquid Crystalline Polymers: Mesogens in the Main Chain and as Side Groups" Makromol. Chem., Rapid Co., #6, pp. 291,198.
Ringsdorf, "Electro-Optical Effects of Azo Dye Containing Liquid Crystalline Copolymers", Makromol. Chem., #185, (1984) pp. 1327-1334.
Meredith, "Optical and Nonlinear Optical Characterization of Molecular Doped Thermotropic Liquid Crystalline Polymers", Macromd. (1982), v. 15, pp. 1385-1389.
Teucher, "Properties of Structurally Stabilized Anil--Type Nematic Liquid Crystals", Mol. Crypt Liq. Cryst, (1970), vol. 11, pp. 187-189.
Zerinalov, "Secret Memory in a Reentrant Nematic Phase", Kristallografiya 30(6), 1207-9.
Advances in Polymer Science "Liquid Crystal Side Chain Polymers", Finkelman et al., pp. 99-123, p. 146, p. 179, p. 225-235, 1984.

Primary Examiner—Matthew A. Thexton
Assistant Examiner—Richard Treanor
Attorney, Agent, or Firm—Depaoli & O'Brien

[57] ABSTRACT

This invention provides novel sidechain liquid crystalline polymers which exhibit nonlinear response, and which have utility as a transparent nonlinear optical component in optical light switch and light modular devices.

An invention sidechain liquid crystalline polymer is illustrated by poly[4-(8-hydroxyoctyloxybenzylideneamino)-4'-nitrostilbene methacrylate]:

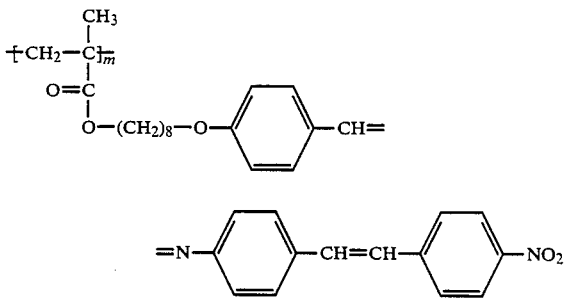

6 Claims, No Drawings

SIDE CHAIN LIQUID CRYSTALLINE POLYMERS EXHIBITING NONLINEAR OPTICAL PROPERTIES

This invention was made with Government support under Contract No. F49620-85-0047 awarded by the Department of Defense. The Federal Government has certain rights in this invention.

BACKGROUND OF THE INVENTION

This application is a division of application Ser. No. 933,425, filed Nov. 21, 1986 now U.S. Pat. NO. 4,855,376, Aug. 8, 1989.

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerative four-wave mixing, whereby real-time processing of optical fields occurs, have potential utility in such diverse fields as optical communications and integrated circuit fabrication.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Of general interest with respect to the present invention is prior art relating to azomethine derivatives, such as that described in U.S. Pat. Nos. 3,041,165; 3,253,022; 3,373,141; 3,483,131; 3,697,595; 3,742,054; 3,872,140; 3,968,159; 3,973,830; 4,122,026; 4,173,544; 4,297,502; and 4,370,502.

There is continuing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide azomethine compositions which are characterized by a delocalized conjugated $\pi$-electron system which can exhibit nonlinear optical response.

It is another object of this invention to provide side chain liquid crystalline polymers which exhibit nonlinear optical response.

It is a further object of this invention to provide high performance nonlinear optical media and devices.

Other objects and advantages of the present invention shall become apparent from the accompanying description and examples.

DESCRIPTION OF THE INVENTION

One or more objects of the present invention are accomplished by the provision of a side chain liquid crystalline polymer characterized by a recurring monomeric unit corresponding to the formula:

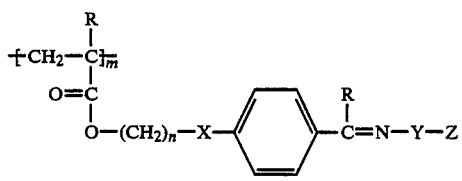

where m is an integer of at least 3; n is an integer between about 1–25; R is hydrogen or a $C_1$–$C_4$ alkyl substituent; X is an electron-donating substituent; Z is an electron-withdrawing substituent; and Y is a substituent selected from

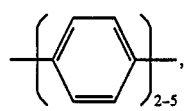

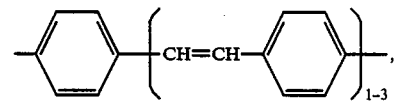

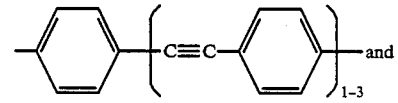

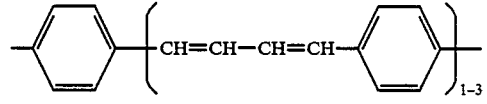

Illustrative of the X substituent in the above polymer formula are electron-donating divalent radicals such as —O—, —S—, and —$NR^1$— where $R^1$ is hydrogen or methyl.

Illustrative of the Z substituent in the above polymer formula are —$NO_2$, —CN and —$CF_3$.

A present invention side chain liquid crystalline polymer typically has a weight average molecular weight between about 1000–500,000; contains mesogenic side-chains which exhibit a second order nonlinear optical susceptibility $\beta$ of at least about $1 \times 10^{-30}$ esu as measured at 1.91 $\mu$m excitation wavelength; has a glass transition temperature above about 40° C.; and exhibits a thermotropic smectic mesophase.

In addition to the recurring acrylate momomeric unit represented in the formula above, the polymer can contain one or more copolymerized monomeric residues derived from vinyl monomers such as alkyl (meth)acrylate, (meth)acrylamide, N,N-dialkyl(meth)acrylamide, vinyl halide, vinyl carboxylate, acrylonitrile, methacrylonitrile, alkene, arylvinyl, and the like. Suitable vinyl monomers include vinyl chloride, vinyl acetate, ethylene, propylene, isobutylene, isoprene and styrene.

The additional vinyl comonomer or comonomers can be incorporated in a proportion up to about 40 weight percent of a present invention liquid crystalline polymer.

In another embodiment this invention provides a thermotropic side chain liquid crystalline polymer characterized by a recurring monomeric unit corresponding to the formula:

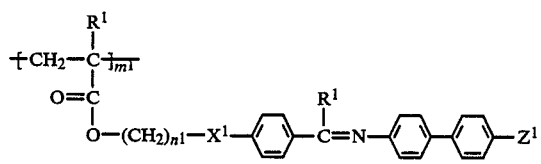

where $m^1$ is an integer of at least 5; $n^1$ is an integer between about 2–20 $R^1$ is hydrogen or a methyl group; $X^1$ is —$NR^1$—, —O— or —S—; and $Z^1$ is —$NO_2$, —CN or —$CF_3$.

In another embodiment this invention provides a thermotropic side chain liquid crystalline polymer characterized by a recurring monomeric unit corresponding to the formula:

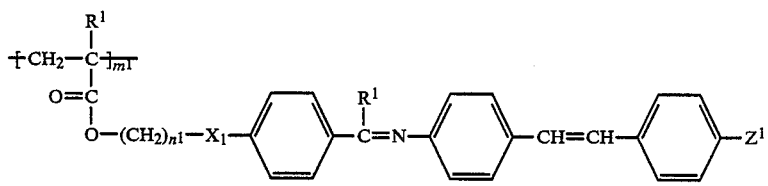

where $R^1$, $m^1$, $n^1$, $x^1$ and $Z^1$ are defined above.

In another embodiment this invention provides a thermotropic side chain liquid crystalline polymer characterized by a recurring monomeric unit corresponding to the formula:

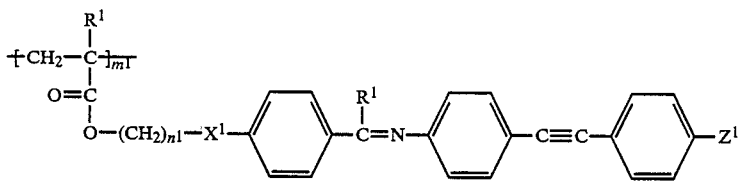

where $R^1$, $m^1$, $n^1$, $X^1$ and $Z^1$ are as defined above.

In another embodiment this invention provides a thermotropic side chain liquid crystalline polymer characterized by a recurring monomeric unit corresponding to the formula:

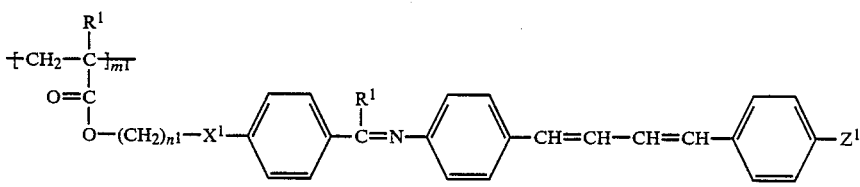

where $R^1$; $m^1$, $n^1$, $X^1$ and $Z^1$ are as defined above.

In another embodiment this invention provides a transparent nonlinear optical medium comprising a thermotropic sidechain liquid crystalline polymer which is characterized by a recurring monomeric unit corresponding to the formula:

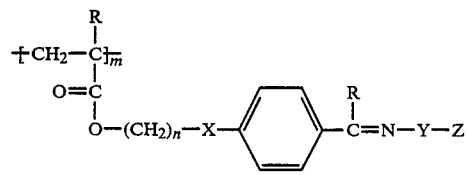

where m is an integer of at least 3; n is an integer between about 1–25; R is hydrogen or a $C_1$–$C_4$ alkyl substituent; X is an electron-donating substituent; Z is an electron-withdrawing substituent; and Y is a substituent selected from

,

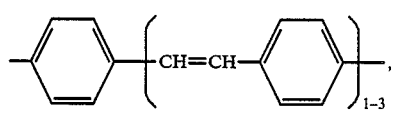,

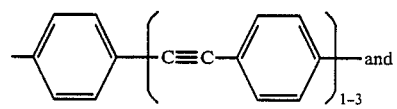 and

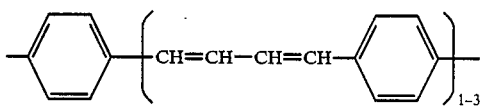

A present invention nonlinear optical medium exhibits second order nonlinear optical response when the macroscopic molecular configuration is noncentrosymmetric. A present invention nonlinear optical medium exhibits third order nonlinear optical response when the macroscopic molecular configuration is centrosymmetric.

A present invention nonlinear optical medium can have an external field-induced molecular orientation.

A present invention nonlinear optical medium can contain a guest organic compound which exhibits nonlinear optical response. This type of guest/host blend is illustrated by a nonlinear optical medium in which the host liquid crystalline polymer corresponds to the formula:

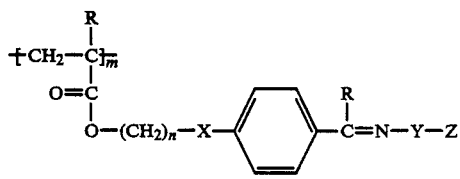

where R, m, n, X and Z are as defined above; and the guest organic compound corresponds to the formula

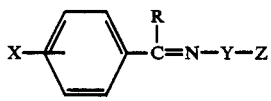

when X, R, Y and Z are as defined above.

In another embodiment this invention provides a light switch or light modulator device with an organic nonlinear optical component consisting of a transparent solid medium comprising a thermotropic sidechain liquid crystalline polymer which is characterized by a recurring monomeric unit corresponding to the formula:

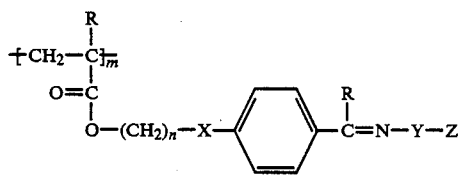

where m is an integer of at least 3; n is an integer between about 1–25; R is hydrogen or a $C_1$–$C_4$ alkyl substituent; X is an electron-donating substituent; Z is an electron-withdrawing substituent; and Y is a substituent selected from

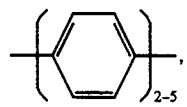

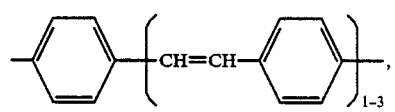

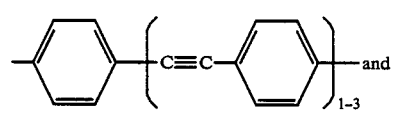

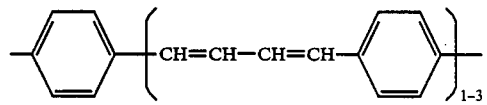

An invention optical light switch or light modulator device typically will have a transparent solid medium of a thermotropic liquid crystalline polymer which has a stable orientation of an external field-induced alignment of mesogens.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

Illustrative of a present invention optical device containing a polymeric nonlinear optical component as defined above is a laser frequency converter, an optical Pockels effect device, an optical Kerr effect device, a degenerate four wave mixing device, an optical interferometric waveguide gate, a wide-band electrooptical guided wave analog-to-digital converter, an optical bistable device, or an optical parametric device.

Optical harmonic generating devices are described in Science, 216 (1982); and in U.S. Pat. Nos. 3,234,475; 3,395,329; 3,694,055; 3,858,124; and 4,536,450.

Optical Kerr effect devices are described in U.S. Pat. Nos. 4,428,873 and 4,515,429; and references cited therein.

Degenerate four wave mixing optical devices are discussed by Y. R. Shen in Chapter 15, "The Principles of Nonlinear Optics"; John Wiley & Sons, New York (1984). A nonresonant degenerate four wave mixing mirror device is described by J. Feinberg et al in Optics Letters, 5(12), 519 (1980).

An optical interferometric waveguide gate device is described by A. Lattes et al in IEEE J. Quantum Electron, QE-19(11), 1718 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280 (1977) and in IEEE Spectrum, June 1981.

Optical parametric devices are described in U.S. Pat. Nos. 3,371,220; 3,530,301; and 3,537,020.

A present invention optical device can be achieved by constructing one of the optical devices described in the technical literature, except that a present invention liquid crystalline polymer alone or in combination with a guest compound is utilized as the nonlinear optical component as described herein.

In a further embodiment this invention provides an acrylic ester composition corresponding to the formula:

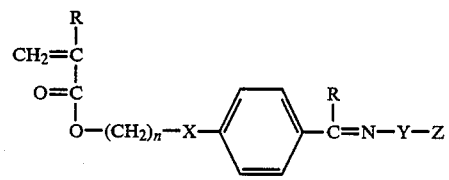

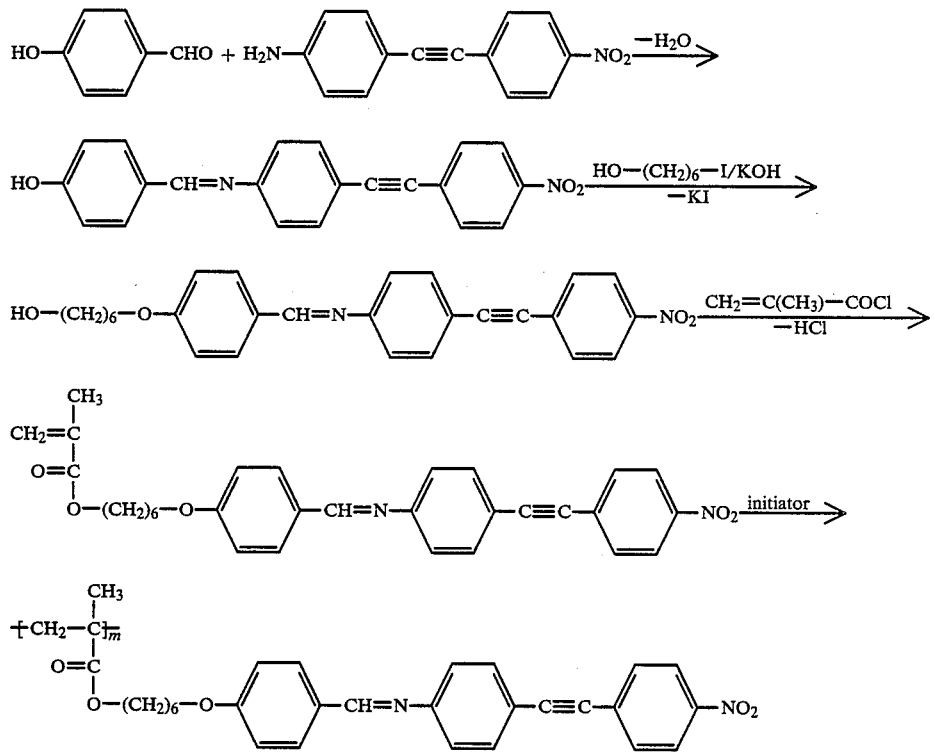

where n is an integer between about 1-25; R is hydrogen or a $C_1$-$C_4$ alkyl substituent; X is an electron-donating substituent; Z is an electron-withdrawing substituent; and Y is a substituent selected from

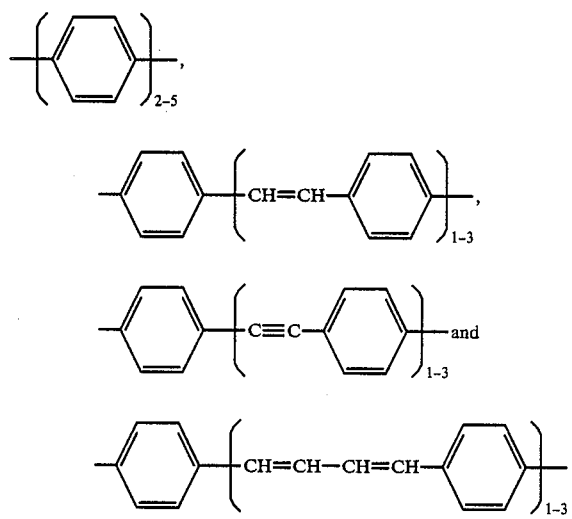

Preferably X is —$NR^1$, —O— or —S—; Y is divalent diphenyl or stilbene; and Z is —$NO_2$, —CN or $CF_3$.

SYNTHESIS OF LIQUID CRYSTALLINE POLYMERS

The preparation of a present invention thermotropic liquid crystalline polymer with azomethine mesogenic sidechains is illustrated by the following flow diagram:

NONLINEAR OPTICAL PROPERTIES

The fundamental concepts of nonlinear optics and their relationship to chemical structures can be expressed in terms of dipolar approximation with respect to the polarization induced in an atom or molecule by an external field.

As summarized in the ACS Symposium Series 233 (1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a liquid crystalline domain:

$$\Delta\mu=\mu_e-\mu_g=\alpha E+\beta EE+\gamma EEE+\ldots \quad (1)$$

$$P = P_0 + \chi^{(1)}E + \chi^{(2)}EE + \chi^{(3)}EEE + \ldots \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave.

A present invention liquid crystalline polymer medium typically is optically transparent and exhibits hyperpolarization tensor properties such as second or third harmonic generation.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

EXTERNAL FIELD INDUCED LIQUID CRYSTAL ORIENTATION

The term "external field" as employed herein refers to an electric, magnetic or mechanical stress field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial The parameter ranges from −0.5 to 1.0 (1.0 corresponds to perfect uniaxial alignment along a given axis. 0.0 corresponds to random orientation, and −0.5 corresponds to random orientation confined in a plane perpendicular to a given axis).

The order parameter thus defined does not distinguish between parallel and antiparallel alignment. Thus, a sample of asymmetric rod-like molecules would have an order parameter of 1.0 for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order are due to nematic fluctuations on a micron length scale which accommodate characteristic defects. These fluctuations may be dynamic for small molecule liquid crystals or frozen for polymeric liquid crystals. In either case, nematic fluctuations scatter light so that aligned samples appear to be hazy (particularly in a thick sample).

Smectic liquid crystals may be aligned by application of an orienting external field, with a resulting order parameter exceeding 0.9. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientational order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material. Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a liquid crystalline surface with an aligning polymer such as nylon. Physical methods (e.g., stretching) rely upon the rigid and geometrically asymmetric character of certain liquid crystalline molecules to induce bulk orientation. Chemical methods (e.g., coating the surface with an aligning polymer) rely upon strong intermolecular interactions to induce surface orientation. All of the methods described above to produce oriented materials apply to both small molecule liquid crystals and polymeric liquid crystals. For polymers which possess a glass transition, the aligned liquid crystalline phase can be frozen by rapid cooling below the glass transition temperature.

Publications relating to external field-induced liquid crystal molecular orientation include The Physics of Liquid Crystals, P. G. deGennes, p. 95-97, Oxford University Press, 1974; J. Stamatoff et al, "X-Ray Diffraction Intensities of a Smectic-A Liquid Crystal", Phys. Rev. Letters, 44, 1509-1512, 1980; J. S. Patel et al, "A Reliable Method of Alignment for Smectic Liquid Crystals", Ferroelectrics, 59, 137-144, 1984; J. Cognard, "Alignment of Nematic Liquid Crystals and Their Mixtures", Mol. Cryst. Liq. Cryst.:Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of a thermotropic sidechain liquid crystalline polymer in accordance with the present invention.

A. 4-(4-hydroxybenzylideneamino)-4'-nitrodiphenyl

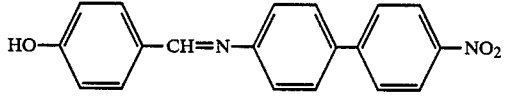

A reactor is charged with toluene (100 ml), 4-amino-4'-nitrobiphenyl (4.28 g, 0.02M) and p-hydroxybenzaldehyde (2.44 g, 0.02M). The solution is heated to reflux temperature, and the heating is continued for a period of about 18 hours, with continuous removal of water with a Dean-Stark trap. The product mixture is distilled to remove the solvent, and the residual solid is recrystallized from 50/50 ethanol/toluene to yield the azomethine product, m.p. 165°-180° C.

The azomethine product can exhibit a second order nonlinear susceptibility $\beta$ of at least about $1 \times 10^{-30}$ esu as measured at 1.91 $\mu$m excitation wavelength.

B. 4-(6-hydroxyhexyloxybenzylideneamino)-4'-nitrodiphenyl

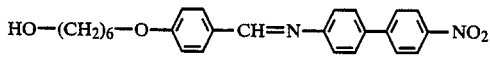

Azomethine product (2 g) from procedure A is charged to a reactor containing ethanol (100 ml).

The reactor is heated to reflux and a solution of potassium hydroxide (0.5 g in 25 ml of H$_2$O) is added dropwise. After complete addition, 2 g of 6-iodohexanol is added and the mixture is heated overnight.

The product mixture is distilled to remove the solvent medium, and the residual solid is recrystallized from 50/50 ethanol/toluene to yield purified product.

C. 4-(6-hydroxyhexyloxybenzylideneamino)-4'-nitrodiphenyl methacrylate

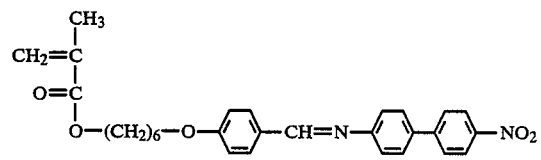

A reactor equipped with a magnetic stirrer, addition funnel, thermometer, condenser and nitrogen inlet is charged with 10 g of 4-(6-hydroxyhexyloxybenzylideneamino)-4'-nitrodiphenyl, 4 g of triethylamine and 500 ml of dioxane. The mixture is heated to 45° C. and a solution of 3 g of methacryloyl chloride in an equal volume of dioxane is added dropwise. Stirring is continued 4 hours, then another 3 g of methacryloyl chloride is added and the mixture is stirred overnight at 45° C.

After solvent removal by vacuum distillation, the residue is slurried in water, filtered, washed with water, and air dried. The solid residue is recrystallized from ethanol to yield a purified product.

D. Poly[4-(6-hydroxyhexyloxybenzylideneamino)-4'-nitrodiphenyl methacrylate]

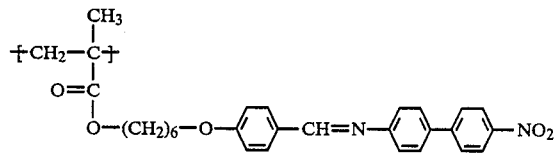

A reactor is charged with 2 g of 4-(6-hydroxyhexyloxybenzylideneamino)-4'-nitrodiphenyl methacrylate and 25 ml of toluene. After purging with nitrogen for 1 hour, 0.65 ml of 1 mole percent of azodiisobutyronitrile solution is added. The reactor is sealed and heated at 60° C. overnight. The mixture then is mixed with methanol in a blender, and the solid polymer product is filtered, washed with methanol, and air dried. The polymer has a weight average molecular weight of about 10,000.

The polymer is dissolved in dimethylacetamide and sprayed on the surface of optical glass to form a transparent coating. The coating exhibits third order nonlinear optical susceptibility $\chi^{(3)}$.

EXAMPLE II

This Example illustrates a poling procedure for producing a second order nonlinear optical side chain liquid crystalline polymer in accordance with the present invention.

A. Poling Cell Construction

A poling cell is constructed from electrically conductive glass plates, such as Donnelly Mirror PD 5007-7. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B Filling The Poling Cell

Poly[4-(6-hydroxyhexyloxybenzylideneamino)-4'nitrodiphenyl methacrylate] of Example I is placed in a vacuum oven and maintained in a melt phase at a temperature of about 120° C. for about 4 hours to eliminate entrained air bubbles from the polymer melt.

The liquid crystalline polymer melt is introduced into the space between the glass plates by charging a drop of the polymer melt to one of the openings of the poling cell space and placing the cell assembly in a vacuum oven maintained at a temperature approximately 10° C. above the clearing temperature of the liquid crystalline polymer. The cell space fills gradually by capillary action. The space filling period is about 4 hours for a 0.5 cm long space. The liquid crystalline polymer melt in the filled cell is bubble-free.

C. Electric Field Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifies the voltage signal from a signal generator(Hewlett-Packard No. 3310B).

The poling cell first is heated to 85° C. to bring the liquid crystal polymer to the isotropic phase. The assembly then is cooled at a rate of 0.2° C./min. until the photodiode signal registers an abrupt increase which indicates that the melt has undergone a transition into a liquid crystalline phase The temperature is further lowered by 2° C. and then maintained at this temperature.

The AC voltage source is set at 500V, and the frequency is set at 2000 Hz. The power to the poling cell is turned on to apply an electric field across the liquid crystalline sample The field strength is calculated to be approximately $2 \times 10^5$ V/cm. About three seconds after the electric field is applied, the photodiode signal drops close to the baseline, indicating that orientation development induced by the electric field is completed. At this point, the cooling is resumed until the temperature reaches 35° C., and the poling assembly is disconnected from the power source.

When the poling assembly is removed from the microscope hot stage, by visual observation the liquid crystalline polymer in the cell space is transparent. This is an indication that the molecular orientation is uniform and homogeneous throughout the sample. Orientation of the sample is further ascertained utilizing a wide angle X-ray diffraction technique, and the Hermann's orientation factor of the sample is approximately 0.9.

D. High Field Poling For Symmetry Control

The oriented liquid crystal sample is subjected further to a higher electric field to develop a noncentrosymmetric orientation of nonlinear optical moieties which are a part of the side chains of the polymer.

The poling cell assembly is heated to approximately 5° C. below the glass transition temperature of the polymer. Then the lead wires of the poling assembly are connected to a DC voltage source (Kepco OPS-3500) and the voltage is turned up slowly until it reaches 2000V. At this point, the electric field strength across the sample is about $8 \times 10^5$ V/cm. The sample is maintained at this field strength level for 24 hours, then the sample is cooled and the voltage source is disconnected. A noncentrosymmetrically oriented liquid crystalline polymer transparent solid phase is obtained by this procedure.

The noncentrosymmetry of the sample is determined from the wide angle X-ray diffraction measurement and the thermally stimulated electrical discharge measurement. The Hermann's orientation function from the X-ray measurement is approximately 0.9.

From the measurements, there is an indication that a major proportion of the nonlinear optical moieties are aligned parallel to the electric field direction, and the rest are oriented antiparallel to the electric field direction.

What is claimed is:

1. A transparent thin film nonlinear optical medium comprising a thermotropic side chain liquid crystalline polymer characterized by a recurring monomeric unit corresponding to the formula:

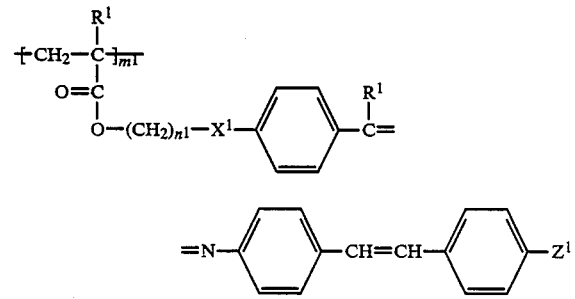

where $m^1$ is an integer of at least 5; $n^1$ is an integer between about 2-20; $R^1$ is hydrogen or a methyl group; $X^1$ is $-NR^1$, $-O-$ or $-S-$; and $Z^1$ is $-NO_2$, $-CN$ or $-CF_3$.

2. A nonlinear optical medium in accordance with claim 1 wherein the medium is blended with a guest compound corresponding to the formula:

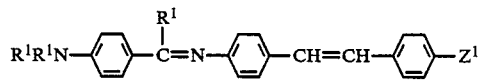

where $R^1$ and $Z^1$ are as previously defined.

3. A nonlinear optical medium in accordance with claim 1 wherein the medium is noncentrosymmetric and exhibits second order nonlinear optical response.

4. A nonlinear optical medium in accordance with claim 1 wherein the medium is centrosymmetric and exhibits third order nonlinear optical response.

5. A nonlinear optical medium in accordance with claim 1 wherein the medium has an external field-induced molecular orientation.

6. A nonlinear optical medium in accordance with claim 1 wherein the medium contains a guest organic compound which exhibits nonlinear optical response.

* * * * *